May 15, 1962
D. T. CARTER ETAL
3,034,926
METHOD OF COATING METAL SHEETS WITH SYNTHETIC PLASTIC
Filed May 17, 1957
3 Sheets-Sheet 1
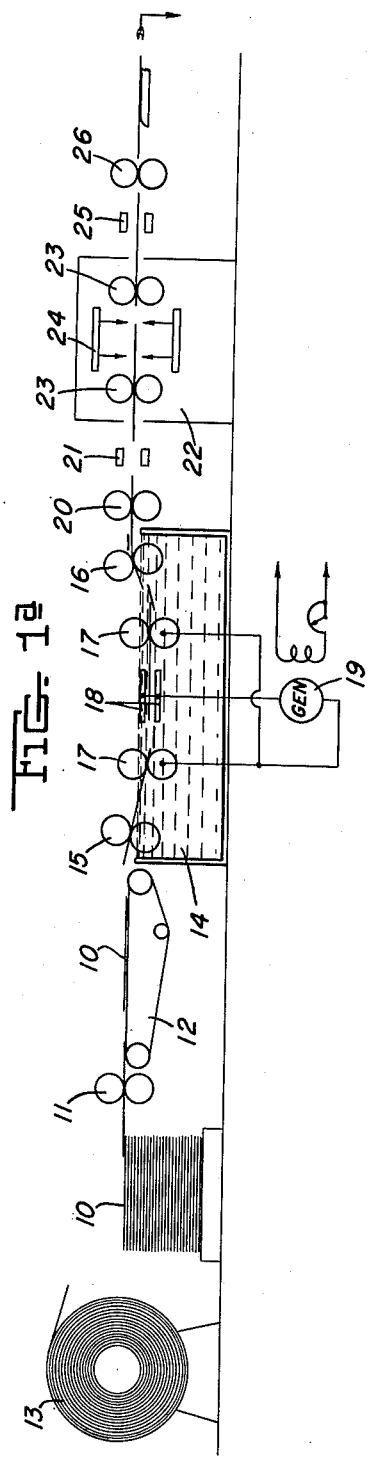
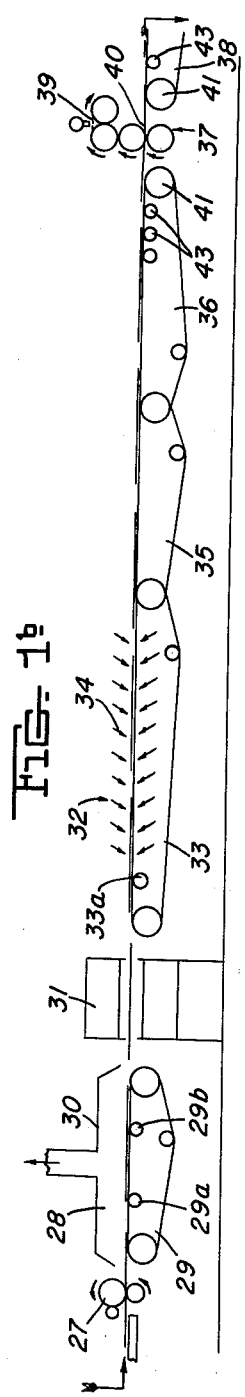
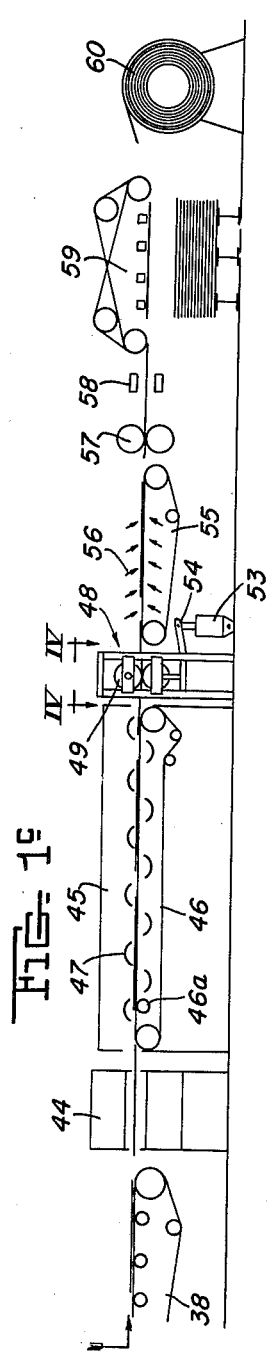
INVENTORS
DANIEL T. CARTER and
GEORGE H. RENDEL
By: Donald G. Dalton
their Attorney May 15, 1962 D. T. CARTER ETAL 3,034,926
METHOD OF COATING METAL SHEETS WITH SYNTHETIC PLASTIC
Filed May 17, 1957 3 Sheets-Sheet 2
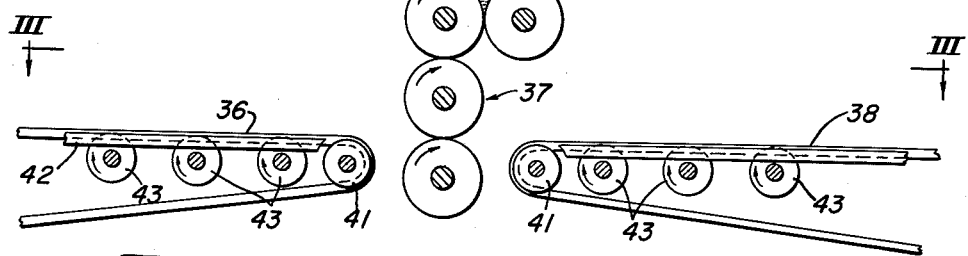
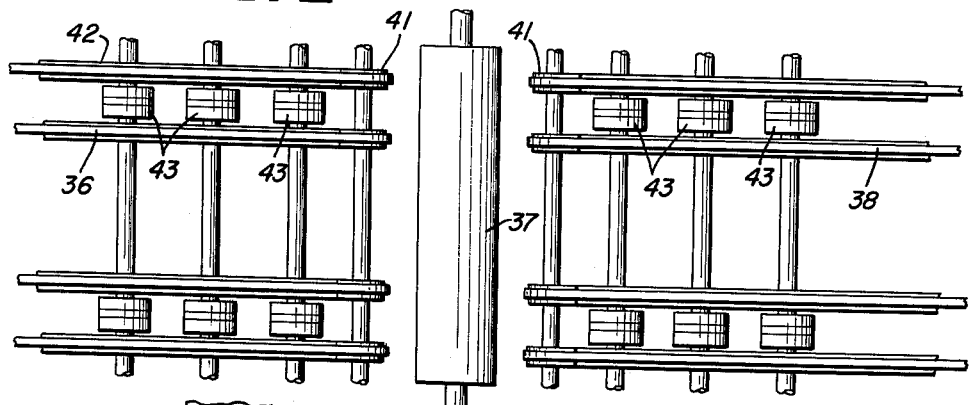
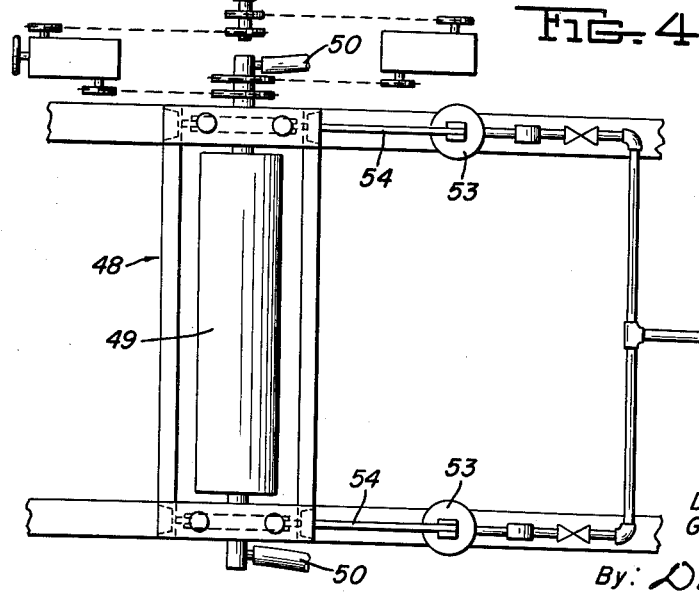
INVENTORS
DANIEL T. CARTER and
GEORGE H. RENDEL
By: Donald G. Dalton
their Attorney May 15, 1962 D. T. CARTER ETAL 3,034,926
METHOD OF COATING METAL SHEETS WITH SYNTHETIC PLASTIC
Filed May 17, 1957 3 Sheets-Sheet 3
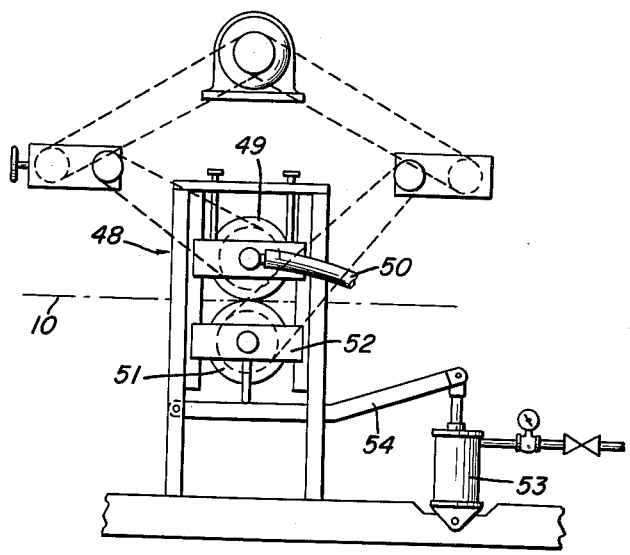
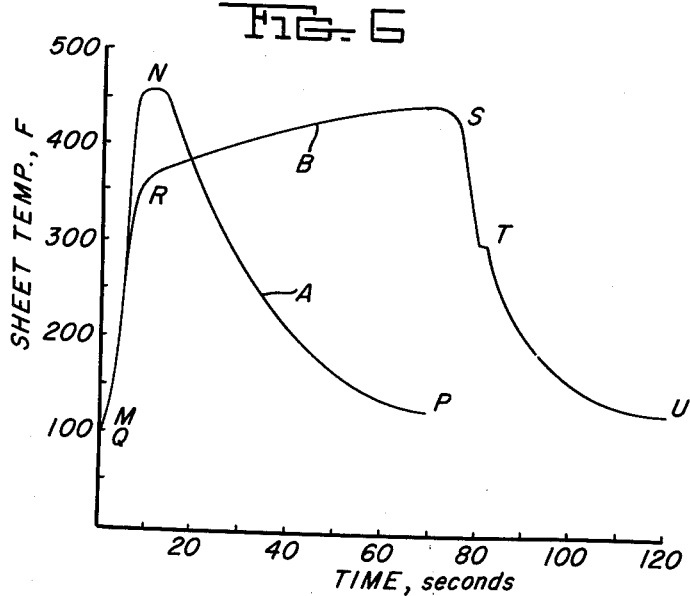
INVENTORS
DANIEL T. CARTER and
GEORGE H. RENDEL
By: Donald G. Dalton
their Attorney 3,034,926
METHOD OF COATING METAL SHEETS WITH SYNTHETIC PLASTIC
Daniel T. Carter, Levelgreen, and George H. Rendel, Mount Lebanon Township, Allegheny County, Pa., assignors to United States Steel Corporation, a corporation of New Jersey
Filed May 17, 1957, Ser. No. 659,897
2 Claims. (Cl. 117—132)

This invention relates to a method of applying a coating of a synthetic plastic of substantial thickness (up to .030″) to a metal backing sheet. The plastic may be a vinyl-chloride polymer and the backing sheet is preferably low-carbon steel, e.g., deep-drawing sheet.

The coating of metal sheets with a permanent decorative surface layer of a synthetic plastic which may be deformed with the sheets, as heretofore carried out, has involved the cementing of a preformed sheet of plastic to the backing sheet. The principal object of our invention is to provide a cheaper method of coating by applying a surface layer as a liquid film of a heat-curable plastic continuously to a traveling metal sheet or strip and then heating the coated backing sheet and the film thereon to effect a substantially uniform cure of the latter throughout its thickness.

More specifically, our invention comprises applying first an organic heat-curable primer or adhesive coating. Preferably, however, the backing sheet has a chemical protective base coating such as a phosphate-chromate layer applied previously by electrolysis. We heat the primer coating to partially cure it and then apply the final coating as a plastisol of a synthetic resin. After a second heating to cure the final coating, we preferably emboss the latter, while still hot, with a cooled roll and then cool the product rapidly to set the coating so as to retain the embossed pattern.

The final heating of the plastic-coated backing sheet presents a problem in that rapid heating is desirable in a continuous process, in the interest of increased production, but the synthetic plastics used for the finish coating are heat-sensitive and may be seriously damaged if too highly heated. According to our invention, we heat the metal base or backing sheet by electromagnetic induction for a few seconds, thereby raising its temperature at a high rate nearly to the maximum safe temperature for the coating. This, of course, starts the heating of the applied resin film by conduction from the interior thereof. If necessary, we thereafter apply heat to the exterior of the coating for a longer time, thereby bringing it up to the desired final temperature throughout its thickness at a lower rate and thus prevent any localized overheating which might damage the coating.

For carrying out our method, we prefer to use a line of apparatus for continuous processing, comprising an electrochemical coating unit, a roller coater for applying primer, a heating unit, a cooler, a second roller coater for applying the finish coating, a second heating unit, an elongated oven, a stand of cooled embossing rolls and a product cooler. The several units mentioned include or are supplemented by conveyors for moving the sheets therethrough.

A complete understanding of the invention may be obtained from the following detailed description and explanation which refer to the accompanying drawings illustrating the present preferred practice and embodiment. In the drawings:

FIGURES 1a, 1b and 1c together constitute a central longitudinal section through the apparatus;
FIGURE 2 is a partial central section to enlarged scale through the roller coater for applying the finish coating and the adjacent conveyors;
FIGURE 3 is a plan view of portions of the conveyors adjacent the roller coater shown in FIGURE 2;
FIGURE 4 is an end view showing the details of the embossing stand;
FIGURE 5 is a plan view corresponding to FIGURE 4; and
FIGURE 6 is a set of curves showing the time-temperature cycle for the curing of the primer (curve A) and finish coating (curve B).

Referring now in detail to the drawings and, for the present, particularly to FIGURES 1a, 1b and 1c, the method of our invention will be explained in the course of the following detailed description of the apparatus involved. Sheets 10, after thorough cleaning, are fed individually to a stand of pinch rolls 11 and are delivered thereby onto a conveyor 12. If strip is being processed, a coil thereof is fed to rolls 11 from any suitable uncoiler 13. The sheets or strip may, for example, be deep-drawing stock of low-carbon steel. From conveyor 12, the metal backing in the form of sheets or strip, enters an electrochemical treating tank 14 provided with entry and exit guide rolls 15 and 16, spaced pairs of contact rolls 17 and electrodes 18. The contact rolls and electrodes are connected to a source of direct current such as generator 19. Tank 14 contains a dilute solution of sodium dichromate and phosphoric acid and the metal sheet passing therethrough is made cathode, all as described in Neish Patent No. 2,812,296, to form a stable foundation coating on the backing sheet by electrolysis. This coating not only protects the back side of the sheet from corrosion but also affords a surface to which the primer coating, to be applied next, adheres effectively.

On emerging from tank 14, the metal sheet passes through a stand of squeege rolls 20 and between warm-air manifolds 21 which serve to dry and harden the electrochemical phosphate-chromate coating. The partially dried sheet next passes through a spray chamber 22 and between spaced pairs of pinch rolls 23 therein. Chamber 22 has spray nozzles 24 which discharge onto both surfaces of the sheet a shower of the solution used as electrolyte in tank 14. Rolls 23 confine the sprayed liquid and are driven to feed the sheet through the chamber. As the sheet emerges from chamber 22, it passes between warm-air manifolds 25 which dry and harden the film deposited by electrolytic and chemical action. The sheet is then fed by a stand of pinch rolls 26 to a roller coater 27.

Roller coater 27 comprises a pair of contact rolls between which the sheet passes and a feed roll which supplies a primer coating from a fountain (not shown) to the upper contact roll. The contact rolls are preferably driven in the directions indicated by arrows so they cooperate to feed the sheet forward. In so doing, the upper contact roll applies a uniform primer coating, about .001″ or less in thickness to the sheet. The primer is a solution of a heat-curable synthetic resin in a volatile organic solvent. A typical formula therefor is:

| | Percent |
|---|---|
| Bakelite phenolic resin | 28 |
| Bakelite vinyl resin | 7 |
| Bakelite epoxy resin | 5 |
| Methyl ethyl ketone | 34 |
| Methyl iso-butyl ketone | 26 |
| | 100 |

The sheet on leaving coater 27 passes through a solvent exhaust chamber 28 comprising a belt conveyor 29 and a hood 30. The conveyor includes idler pulleys 29a, spaced belts traveling over them and driven magnetic rolls 29b disposed between the belts. The relations of these elements will be made clearer in a description of similar conveyors downstream from conveyor 29 (FIG- URES 2 and 3). The rolls 29b attract the sheets into frictional engagement and drive them forward with the belts which support them. In passing along conveyor 29, the solvent of the primer coating evaporates at least partially, the vapor being exhausted by hood 30 which induces a flow of air over the sheet as it travel therethrough. After at least partial evaporation of the solvent, the sheet leaves hood 30 and enters a heating unit 31.

Heating unit 31 may be of any type capable of heating the metal sheet at a rate of from 25 to 75° F. per second, preferably about 50° F. per second, as shown by the ascending portion M—N of curve A in FIGURE 6. It may serve to generate heat in the sheet as by electromagnetic induction or to radiate or conduct heat from the exterior. This latter is feasible because the primer coating is very thin. We prefer to use induction heating whereby high-frequency alternating current in a winding adjacent the path of the sheet induces eddy currents in the sheet, heating the latter by $I^2R$ losses. Unit 31 is designed to subject every point on the sheet traveling therethrough to heating for from 5 to 10 seconds, preferably about 7 seconds. Thus the sheet is heated to a maximum temperature of between 300 and 500° F., say about 400° F., for example. This causes the primer solvent remaining unevaporated to flash into vapor and the film of adhesive solute left on the sheet to be at least partially cured. After passing through the heating unit 31, the sheet immediately enters a cooler 32.

Cooler 32 comprises a belt conveyor 33 including pulleys at the extreme ends and a magnetic roller 33a adjacent the entrance end. The cooler is provided with nozzles 34 effective to discharge jets of cooling air or water vapor onto the sheet. By this means the temperature of the sheet is reduced to from 80 to 130° F., preferably about 110° F., as shown by the portion N—P of curve A. On leaving the cooler, the sheet passes over a bridging conveyor 35 to the feed-in conveyor 36 of a reverse roller coater 37, having a discharge or carry-away conveyor 38.

Coater 37 comprises a stack of three rolls driven in the directions indicated, the upper one of which has a cooperating roll constituting therewith a fountain 39 (see FIGURE 2). The bottom roll tends to feed the sheet forward. The middle roll rotating reversely, wipes onto the sheet a film 40 of a plastisol drawn from the fountain by the top roll and transferred thereby to the middle roll. As shown in FIGURES 2 and 3, the spaced belts of conveyors 36 and 38 are trained over end pulleys 41 one of which is driven, and travel in fixed guides 42. Driven magnetic rollers 43 between the belts are positioned so that the top points on their peripheries are slightly below the level of the tops of the belts. The sheets are thus attraced ino frictional driving engagement with the belts and are positively driven through the coater thereby even though the two lower rolls exert opposing thrusts thereon. This arrangement of belts and magnetic rolls also characterizes conveyors 29 and 33 previously mentioned.

The plastisol in fountain 39 is a heat-curable synthetic resin such as polyvinyl chloride with a plasticizer and diluent added. A suitable composition (without pigment) is:

| | Percent |
|---|---|
| Poly vinyl chloride resin | 60 |
| Di octyl phthalate | 11 |
| Di normal octyl decyl phthalate | 9 |
| Di butyl phthalate | 9 |
| Iso octyl palmitate | 2 |
| Alkyd polymeric ester plasticizer (Rohm & Haas Paraplex G-60) | 4 |
| Calcium carbonate | 2 |
| Cadminum-tin stearate | 3 |
| | 100 |

By means of the reverse roller coater, a film of plastic of substantially uniform thickness may be laid on the sheet. The film thickness may be from .001″ to .030″ and may be maintained with a tolerance of ± .00075″.

After leaving coater 37, the sheet is fed forwardly by conveyor 38 through an induction heating unit 44. This unit is designed to heat progressively each point on a sheet from its coating temperature of about 100° F. to a temperature between 250° and 450° F., in the time of travel through the unit, depending on the particular plastisol being applied as a coating and the speed of travel. Preferably the heating of the backing sheet is effected at a rate of 25 to 50° F. per second, say about 40° F. per second, as shown by the steeply rising starting portion Q—R of curve B in FIGURE 6. The heat generated in the backing sheet by induction is effective immediately to start the curing of the portion of the coating film next to the metal and thence outwardly therefrom. The resin composing the film is a poor conductor, however, and a fairly steep temperature gradient may therefore exist between the interior and exterior of the film. To avoid this result, we preferably pass the sheet immediately from induction heating unit 44 into an oven 45 effective to supply additional heat to the exterior of the film to raise its temperature somewhat further at a reduced rate and prevent loss of heat from the backing sheet.

Oven 45 comprises an elongated chamber through which a conveyor 46 passes, provided with heating means such as infra-red lamps or radiators 47. The conveyor has a magnetic roll 46a similar to rolls 43. In passing through the oven, the temperature of the coating film is equalized throughout the thickness thereof and the temperature of the sheet generally is raised along the slowly rising portion R—S of curve B at a much reduced rate, say from 1 to 2° F. per second, reaching a final temperature of about 450° F. in a time of about 80 seconds. This extended heating effects a complete cure of the coating film, but avoids excessive temperature in any portion of the film at any time.

From oven 45, the sheet passes immediately through a stand of embossing rolls 48. The upper roll 49, a metal embossing roll, is hollow and is water cooled by connections 50 (FIGURE 4). The lower roll 51, a back-up roll of rubber or like material, is journaled in bearings 52 actuated by fluid-pressure cylinders 53 through lever mechanisms 54. By virtue of the provision for water-cooling, roll 49 is maintained at a temperature of from 80 to 150° F., say about 110° F. Contact of the roll at such temperature with the coating film at a temperature of about 450° F., immediately imparts the surface pattern of the roll to the film and chills the latter as shown by the steeply falling portion S—T of curve B. This sets the film and leaves it permanently embossed. On emerging from stand 48, the sheet is carried by a conveyor 55 between nozzles 56 discharging jets of cooling air or water vapor on the sheet and causing its temperature to drop along the gradually descending portion T—U of curve B. From conveyor 55, the sheet passes through a stand of squeegee rolls 57, then between warm-air drier manifolds 58 and thence to a magnetic piler 59. In the case of strip, the material is wound on a recoiler 60.

To obtain accurate control of the coating-film thickness and degree of cure of the coating, it is essential that the speed of travel be uniform as the backing sheet passes through roller coaters 27 and 37, induction-heating coils 31 and 44 and heating oven 45. If the sheet travel is interrupted or retarded when it is passing through one of the heaters, the coating film may be overheated and possibly damaged or destroyed. Uniform speed of sheet travel is obtained by the use of magnetic rolls 43, in cooperation with conveyors 29, 33, 36, 38 and 46. The magnetic rolls are in contact with the bottom surface of the sheet and provide positive propulsion thereof through the several portions of the treating line referred to. An important feature of the conveying apparatus lies in the construction which insures separating the trailing end of a steel backing sheet from magnetic rolls 43. FIGURE 2 illustrates this feature in conveyors 36 and 38, cooperating with roller coater 37. The same feature is utilized on conveyors 29, 33 and 46. Magnetic rolls 43 in cooperation with the belts of conveyors 36 and 38 effect positive movement of the sheet with respect to the roller coater 37.

The forward frictional driving force imparted to the sheet by anyone of the magnetic rolls 43 becomes ineffective as soon as the trailing end of the sheet leaves that roll. As a consequence, the attraction of the magnet might tend to hold the end of the sheet against continued forward motion. By the arrangement illustrated in FIGURE 2, however, a conveyor belt rigidly supported by guide 42 is provided on both sides of each magnetic roll 43, the top of the conveyor belt being supported about $1/16$ to $1/8$ inch below the top point on the surface of the magnetic roll. Thus, as the trailing end of the sheet tends to be attracted by a rotating magnet roll, the sheet is forced downward against the forward-moving conveyor belt 45, thereby increasing the sheet pressure against the belt so that the frictional force of the driven conveyor belts is greater than the retarding force of the magnet. This pulls the sheet end away from the magnetic rolls and maintains continued forward movement thereof without interruption.

The magnetic rolls 43, in combination with the synchronized forward-moving conveyor belts when applied as described above, have resulted in a positive, accurate feed for passing sheets through the critical portions of the processing line.

It will be apparent that our invention provides a method for applying a tough, adherent decorative coating to sheet metal rapidly and efficiently. The product can be made relatively cheaply, has many uses and, because of its numerous advantages, is attractive to users for fabricating a wide variety of articles.

The cooling of the primer-coated sheet, before application of the finish coating of plastisol, prevents premature curing of the latter which would otherwise occur by residual heat, and insures proper leveling of the plastisol layer to eliminate ripples.

Although we have disclosed herein the preferred embodiment of our invention, we intend to cover as well any change or modification therein which may be made without departing from the spirit and scope of the invention.

We claim:

1. A method of applying to a metal backing sheet a decorative coating of a heat-curable synthetic resin, consisting of first spreading substantially uniformly over the surface of the sheet an adhesive primer coating of a solution of a heat-curable resin in a volatile organic solvent, heating the sheet to a temperature of from 300 to 500° F., thereby at least partially curing the resin film left on the sheet by evaporation of the solvent, then applying to the sheet a substantially uniform finish coating of a plastisol of said first-mentioned heat-curable resin over the primer coating, heating the sheet interiorly by electric resistance to from 250 to 400° F. to initiate curing of the finish coating, then immediately passing the sheet through an oven and thereby heating said finish coating from the exterior for a predetermined time to complete the curing thereof.

2. The method defined by claim 1, characterized by cooling the sheet substantially to atmospheric temperature after curing the first coating thereon.

References Cited in the file of this patent

UNITED STATES PATENTS

| | | |
|---|---|---|
| 1,282,564 | Gage | Oct. 22, 1918 |
| 1,472,884 | Pater | Nov. 6, 1923 |
| 1,555,860 | Ledwinka | Oct. 6, 1925 |
| 2,296,070 | Thompson et al. | Sept. 15, 1942 |
| 2,302,332 | Leekley | Nov. 17, 1942 |
| 2,431,078 | Powell | Nov. 18, 1947 |
| 2,495,630 | Dorst | Jan. 24, 1950 |
| 2,550,232 | Donnell et al. | Apr. 24, 1951 |
| 2,606,866 | Neish | Aug. 12, 1952 |
| 2,632,918 | Bergstein | Mar. 31, 1953 |
| 2,636,257 | Ford | Apr. 28, 1953 |
| 2,769,774 | Loveland et al. | Nov. 6, 1956 |
| 2,833,672 | Laubscher et al. | May 6, 1958 |